United States Patent
Wang et al.

(10) Patent No.: US 10,361,406 B1
(45) Date of Patent: Jul. 23, 2019

(54) FLEXIBLE BATTERY DEVICE

(71) Applicant: AMAZON TECHNOLOGIES, INC., Seattle, WA (US)

(72) Inventors: David Wang, Santa Clara, CA (US); Ramez Nachman, San Francisco, CA (US); James Robert Lim, San Jose, CA (US); Bryan Holmdahl, Santa Clara, CA (US); Yuting Yeh, Sunnyvale, CA (US); Matthew Wong, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 276 days.

(21) Appl. No.: 15/277,867

(22) Filed: Sep. 27, 2016

(51) Int. Cl.
| | |
|---|---|
| *H01M 14/00* | (2006.01) |
| *H01M 2/02* | (2006.01) |
| *H01M 2/08* | (2006.01) |
| *H01M 10/0525* | (2010.01) |
| *H01M 10/42* | (2006.01) |

(52) U.S. Cl.
CPC ......... *H01M 2/0275* (2013.01); *H01M 2/026* (2013.01); *H01M 2/08* (2013.01); *H01M 10/0525* (2013.01); *H01M 10/425* (2013.01); *H01M 2220/30* (2013.01)

(58) Field of Classification Search
CPC ...... H01M 2/0275; H01M 2/026; H01M 2/08; H01M 10/0525; H01M 10/425; H01M 2220/30
See application file for complete search history.

(56) References Cited

U.S. PATENT DOCUMENTS

2015/0138699 A1* 5/2015 Yamazaki ............... G06F 1/163
361/679.03

\* cited by examiner

*Primary Examiner* — Jane J Rhee
(74) *Attorney, Agent, or Firm* — Lindauer Law, PLLC

(57) ABSTRACT

A power source, designed to be bent or flexed during use, may include a layer of anode material having a length greater than a layer of cathode material to accommodate for movement of the cathode or anode layers during flexing of the power source. An enclosure containing the cathode and anode materials may include an inner protective layer proximate to the cathode and anode layers and a water-impermeable layer external to the inner protective layer. The water-impermeable layer may have a pleated or corrugated configuration that may be extended when the power source is bent under application of a flexure stress, preventing damage or deformation to the water-impermeable layer.

20 Claims, 8 Drawing Sheets

FLEXIBLE BATTERY DEVICE

BACKGROUND

A wide variety of devices utilize batteries to provide electrical power for operation. For example, smartphones, medical devices, and so forth, may utilize electricity from batteries to operate. In some applications, it may be advantageous to have batteries that may be bent or flexed during use.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
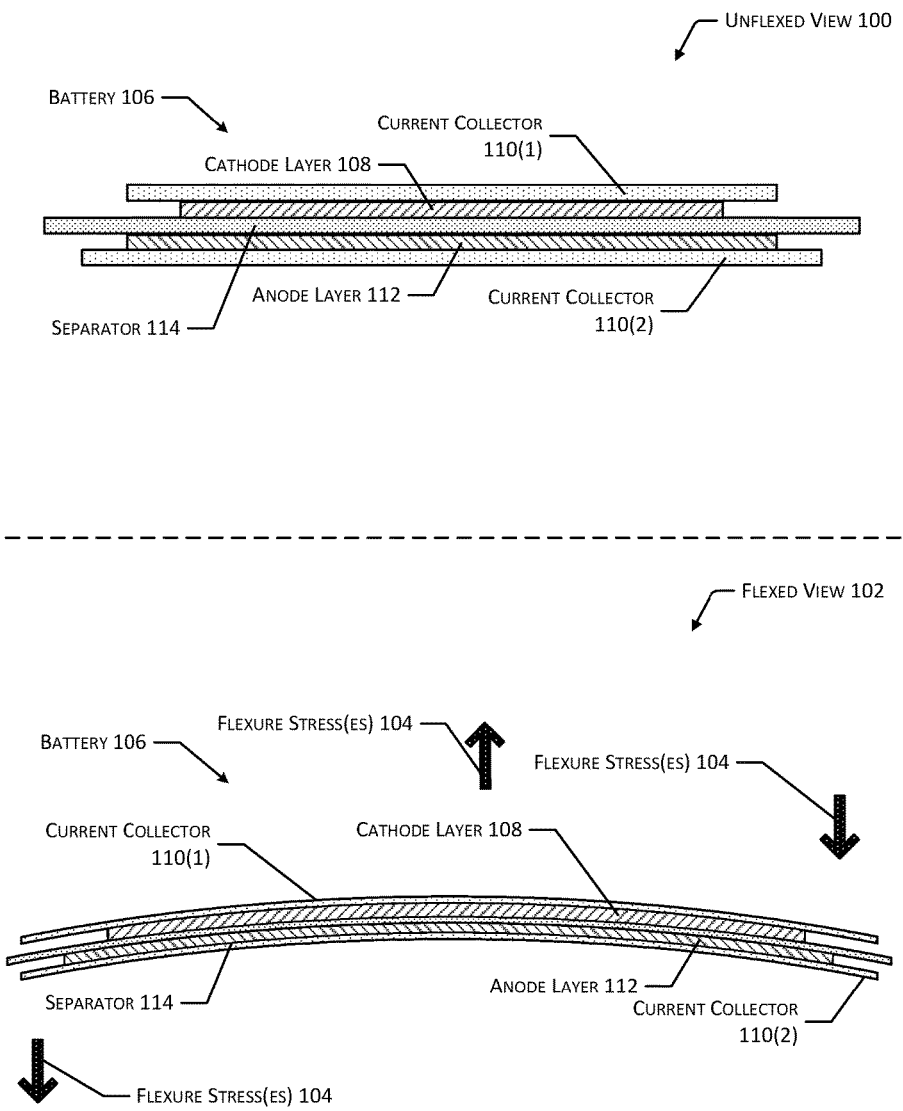
FIG. 1 depicts views of a power source at a first time in the absence of a flexure stress and at a second time under application of one or more flexure stresses illustrating flexing of the power source.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Some types of battery powered portable devices, such as wearable computing devices, electronic book (e-book) readers, and so forth, may be designed to be bent or flexed during use. For example, a computing device that is worn around a user's wrist may include portions that may be bent to a radius of curvature approximating that of a human wrist without damage. As another example, portions of an e-book reader may be designed to be flexible under application of a flexure stress to provide a user experience that simulates the handling of a paperback book. Certain internal components of a flexible computing device, such as the battery, may limit the extent to which the device may be bent or flexed or may limit the portions of the device that are able to bend or withstand a flexure stress. For example, a typical lithium-ion battery used to provide power to a portable computing device is a generally rigid structure that may not be bent to a significant degree without damage. Therefore, the portion of a device that houses such a battery would be generally inflexible. In some cases, the size of a battery used to power such a device may be limited to reduce the impact of the battery rigidity on the ability to bend the device. However, the quantity of energy stored in a battery of reduced size may be insufficient to power the computing device for a significant period of time, resulting in an adverse user experience.

Described in this disclosure are flexible battery devices that may enable various types of power sources to be bent or flexed under application of a flexure stress, without damage to the power source. For example, a flexible power source may be designed to be flexed to a radius of curvature of 500 millimeters (mm) or less without becoming damaged. In another implementation, the flexible power source may be designed to be flexed to a radius of curvature ranging from 20 mm to 100 mm, or less. Such power sources may include, without limitation, lithium-ion batteries, other metal-ion batteries, lithium-metal batteries, other metal batteries, and so forth. In some implementations, to facilitate the flexibility of the power source and to facilitate placement of the power source within a computing device, the power source may have a limited overall thickness, based on the desired radius of curvature when a flexure stress is applied to the power source. For example, a lithium-ion battery may have an overall thickness of 1.0 mm or less. As another example, a lithium-ion battery that may be flexed to a radius of curvature of 50 mm and may have a thickness of 0.5 mm or less.

In some implementations, a flexible power source may be constructed using a stack architecture, in which alternating layers of anode material and cathode material may be stacked atop one another, separated by a polymer-based separator layer, and interspersed with a gel electrolyte or other type of electrolyte. The stack architecture may be constructed without folds or deformation in the anode, cathode, or separator layers to prevent damage or cracking of the layers under application of a flexure stress. Additionally, the lack of folds or deformation in the layers of the stack architecture may enable the layers to slide in a lateral direction relative to one another under application of the flexure stress, which may also prevent damage to the layers. In some cases, use of a gel-based electrolyte may increase adhesion between the layers.

In some implementations, the length of the anode layer may be greater than the length of the cathode layer so that the ends of the anode extend beyond those of the cathode, even when the power source is bent and one or more of the anode or cathode layers may slide laterally relative to other layers in the power source. For example, during application of a flexure stress to a power source, both an anode layer and an adjacent cathode layer may flex. One or more of the anode layer or the cathode layer may also move in a lateral direction. Due to the length of the anode layer exceeding that of the cathode layer, the ends of the anode layer may be closer to the edges of the power source than the ends of the cathode layer, even if the flexure stress causes movement of one or more of the anode layer or the cathode layer in a lateral direction. In other implementations, the length of the separator may also be greater than that of the cathode layer or anode layer to reduce the likelihood of the end of the cathode layer or anode layer extending past a corresponding end of the separator to contact the other electrode. The amount by which the length of the anode layer exceeds that of the cathode layer and the length of the separator exceeds that of the anode layer may be determined based on the bend radius of the battery. For example, for a device having a smaller radius of curvature, the length of the anode layer may exceed that of the cathode layer by a greater amount than the difference in lengths for a device having a larger radius of curvature. Continuing the example, for each decrease of 10 mm in the radius of curvature of a power source, the difference in the length of the anode layer and cathode layer may increase by 0.1 mm. In some implementations, the length of the anode layer may exceed that of the cathode layer on a single side of a battery. For example, a device may be designed such that the right side thereof is flexible while the left side thereof is inflexible. Therefore, when a flexure stress is applied to the right side of the battery, the extended length of the anode layer may compensate for movement of the anode layer or cathode layer, while an extended length of the anode layer on the inflexible side of the device is unnecessary.

The cathode and anode layers of the power source may each be associated with a respective current collector. For example, in a lithium-ion battery, the anode may be associated with a copper current collector and the cathode may be associated with an aluminum current collector. The current collectors may be engaged with a protection circuit module (PCM) or other type of battery management system (BMS) that may be used to monitor various metrics of the battery, such as voltage, temperature, state of charge, state of health, and so forth, and regulate charging and discharging functions of the power source.

In some cases, a PCM may be engaged to an edge of the power source. For example, the current collectors may include a tab or other type of protruding member to which the PCM may be coupled. However, the rigidity of the PCM may limit portions of the power source that may be bent or flexed. In other implementations, the PCM may include two or more circuit portions attached to different locations along an edge of the power source. For example, the PCM may include a first circuit portion at a first end of the power source and a second circuit portion at a second end thereof. The circuit portions may be connected by a wire, cable, or other type of flexible conductor, such that the placement of the PCM does not significantly affect the portions of the power source that may be bent.

To limit the overall thickness of the power source, in some implementations, the current collectors may include an integrated tab or protrusion for engagement with the PCM. While conventional current collectors may include a tab that is welded thereon, use of a welded tab may increase the thickness of the power source. Therefore, a current collector may have a generally planar shape, and a protruding portion may extend from an edge of the planar shape in a direction parallel to the plane of the current collector. In some implementations, a plate of nickel or other metal may be attached to the current collector tabs to facilitate engagement with the PCM.

The anode layer(s), cathode layer(s), separator layer(s), PCM, current collectors, and a gel electrolyte or other electrolyte material may be contained within a pouch or other type of enclosure to protect the power source from damage. The enclosure may also protect other device components from damage caused by contact with components of the power source. The enclosure may include an inner protective layer used to protect the components of the battery and to seal the enclosure about the battery, and a water-impermeable layer external to the inner protective layer. For example, the inner protective layer may include polypropylene trilaminate or another type of polymer, which in addition to protecting the battery, may function as an adhesive layer. For example, layers of polypropylene trilaminate on opposing sides of the pouch may be sealed to one another to form edges of the pouch. The water-impermeable layer may include aluminum or another water-impermeable metal, polymer, composite, and so forth. In some implementations, an outer protective layer, such as a layer of nylon, may be placed outside of the water-impermeable layer. In addition to protecting the water-impermeable layer from scratches or other types of damage, nylon may be used to receive a dye, printed text or graphics, or other indicia that may be used to provide information regarding the power source or to provide the power source with a desired aesthetic appearance.

To prevent cracking, folding, or deformation of a water-impermeable aluminum layer that may be caused by repeated bending thereof, in some implementations, the water-impermeable layer may be provided with a corrugated configuration. For example, the water-impermeable layer may be pleated or accordion-folded. As the power source is flexed under application of a flexure stress, the water-impermeable layer may extend as the pleated portions are elongated. Use of a corrugated configuration that may be stretched or elongated to an extended configuration under application of a flexure stress may therefore reduce the stress provided to the water-impermeable layer and prevent cracking, folding, or deformation thereof. When the flexure stress is no longer applied to the power source, the water-impermeable layer may return to the corrugated configuration.

In other implementations, the water-impermeable layer may include a transparent material, such as glass. For example, a Willow glass laminate having a thickness of 0.1 mm from Corning Incorporated may be flexed to a bend radius of approximately 50 mm without damage, while a Willow glass laminate having a thickness of 0.2 mm may be flexed to a bend radius of approximately 100 mm without damage. Use of a transparent material may enable visual inspection of the power source, such as to determine proper alignment of the layers of the stack architecture, corrosion or damage to any of the materials, and so forth.

To further prevent cracking or deformation of the materials of the enclosure, the edges of the enclosure may be sealed using adhesive properties of the inner protective layer, rather than folded. Regions of the enclosure that are folded may receive additional stress when the power source is bent or flexed. Forming edges of the enclosure that lack folds may reduce this source of stress. In some implementations, to improve the mechanical strength of the sealed edges, the edges may be provided with an enhanced width, such as a width greater than 3 mm. For example, a sealed edge may have a width of 5 mm. In other implementations, the enclosure may include one or more folded edges that are parallel to the axis about which the power source is bent, while edges that are non-parallel or perpendicular to the axis may be sealed without the use of folds. In some cases, one or more folded edges may not necessarily be sealed using the inner protective layer. For example, the manner in which the material of the enclosure is folded to form the edge may seal the edge from the infiltration or exfiltration of materials even in the absence of an adhesive seal.

FIG. 1 depicts two views of a power source, the views including an unflexed view 100 and a flexed view 102. The unflexed view 100 may illustrate the power source at a time when the power source is not affected by a flexure stress 104, while the flexed view 102 may illustrate the power source at a time when one or more flexure stresses 104 are applied to the power source. FIG. 1 depicts the power source as a battery 106 having a stack architecture, such as a lithium-ion battery. In other implementations, other types of batteries 106 or other power sources may be used. The battery 106 includes a cathode layer 108 associated with a first current collector 110(1) and an anode layer 112 associated with a second current collector 110(2). The cathode layer 108 and anode layer 112 are prevented from contacting one another by placement of a separator 114 between the cathode layer 108 and anode layer 112. An electrolyte (not shown), such as a gel or liquid electrolyte, may be placed in association with the cathode layer 108 and anode layer 112. While FIG. 1 depicts a single cathode layer 108, anode layer 112, and separator 114 for illustrative purposes, a battery 106 may include any number cathode layers 108, separators 114, and anode layers 112, stacked in an alternating manner.

In some implementations, in a lithium-ion battery, the anode layer(s) 112 may be formed from a carbon material, such as graphite, while the cathode layer(s) 108 may be formed from a metal oxide, such as lithium cobalt oxide. The electrolyte associated with the anode layer(s) 112 and cathode layer(s) 108 may include one or more lithium salts in an organic solvent, such as ethylene carbonate. The separator(s) 114 may include a polymer-based membrane that is chemically stable in the presence of the electrolyte, and that prevents contact between an adjacent anode layer 112 and cathode layer 108 while permitting the flow of ions through the membrane. For example, the separator 114 may be formed from polyethylene, polypropylene, or another polyolefin. The current collectors 110 may include metallic foils or other types of metallic layers that may function to collect and transport electrical current to and from the anode layer 112 and cathode layer 108. For example, the first current collector 110(1) associated with the cathode layer 108 may include a layer of aluminum, and the second current collector 110(2) associated with the anode layer 112 may include a layer of copper.

As shown in the unflexed view 100, in the absence of a flexure stress 104, the current collectors 110, anode layer 112, cathode layer 108, and separator 114 may have a generally flat configuration, lacking any significant folds or deformations. For example, each layer of the battery 106 may be generally parallel to one another. The absence of folds or deformations in the stack architecture of the battery 106 enables the thickness of the battery 106 to be minimized while facilitating parallel stacking of the layers. For example, in some implementations, the overall thickness of the battery may be one millimeter or less. The absence of folds or deformations in the layers of the battery 106 may also enable one or more of the current collectors 110, anode layer(s) 112, cathode layer(s) 108, or separator(s) 114 to slide in a lateral direction relative to one or more other layers under the application of an orthogonal or flexure stress 104 to the battery 106. Lateral movement of a layer of the battery 106 may reduce the likelihood of cracking or other types of damage to the layers by compensating for at least a portion of the stress applied to the layers via the flexure stress(es) 104.

FIG. 1 also depicts a flexed view 102 of the battery 106, under the application of one or more flexure stresses 104. A flexure stress 104 may include any force applied to any portion of the battery 106 that is non-parallel to the layers thereof, including without limitation orthogonal forces. In some cases, a flexure stress 104 may include a force that is parallel to one or more layers that causes bending, flexing, or buckling of one or more of the layers in a direction non-parallel to the layers. Due to the small overall thickness of the battery 106 and the material characteristics of one or more of the layers thereof, the battery 106 may be flexed to a bend radius dependent on the dimensions of the battery 106 and the nature of the materials from which the battery 106 is formed. For example, in one implementation, a battery 106 having a thickness of 0.5 mm may be flexible to a bend radius of 50 mm. As described previously, in some cases, under application of one or more flexure stresses 104, one or more layers of a battery 106 may slide (e.g., in a lateral direction) relative to one or more other layers to reduce the likelihood of cracking or other types of damage or deformation to one or more layers of the battery 106.

Figure 2:
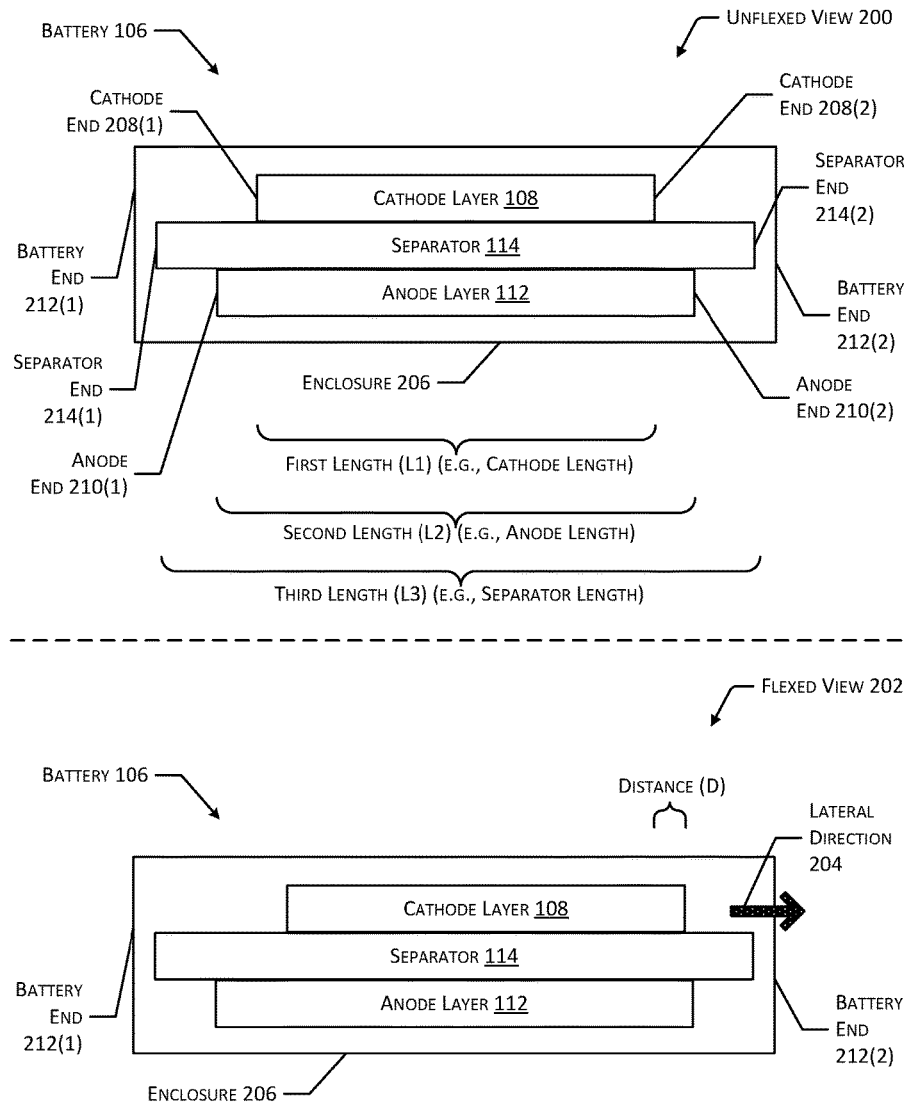
FIG. 2 depicts views of a power source at a first time in the absence of a flexure stress and at a second time under application of one or more flexure stresses illustrating lateral movement of a layer of the power source relative to other layers.

FIG. 2 depicts two views of a power source that include an unflexed view 200 and a flexed view 202. In the unflexed view 200, the power source is not affected by a flexure stress 104, while in the flexed view 202, one or more flexure stresses 104 (not shown in FIG. 2) applied to the power source may cause one or more layers thereof to move in a lateral direction 204 relative to one or more other layers of the power source. A lateral direction 204 may include a direction generally parallel to one or more layers of the power source, such as a direction toward an end of the power source. For illustrative purposes, FIG. 2 depicts the flexed view 202 of the power source lacking a curved shape indicative of bending or flexing caused by application of one or more flexure stresses 104 to better illustrate the movement of one or more layers of the power source in the lateral direction 204 relative to one or more other layers.

FIG. 2 depicts the power source as a battery 106 having a cathode layer 108 and an anode layer 112 separated by a separator 114. While FIG. 2 depicts a single cathode layer 108, anode layer 112, and separator 114 for illustrative purposes, a battery 106 may include any number of cathode layers 108, anode layers 112, and separators 114 stacked in an alternating manner. The cathode layer 108 and anode layer 112 may be associated with respective current collectors 110 (not shown in FIG. 2). The components of the battery 106 may be contained within an enclosure 206. As described previously, in one implementation, an enclosure 206 for containing a battery 106 may include an inner protective layer (not shown in FIG. 2) formed from a material having adhesive properties, such as polypropylene. The enclosure 206 may also include a water-impermeable layer (not shown in FIG. 2), such as a thin layer of aluminum or glass, and an outer protective layer (not shown in FIG. 2), such as a layer of nylon or a similar material.

The cathode layer 108 may include a first cathode end 208(1) and a second cathode end 208(2), which define a first length (L1) of the cathode layer 108. The anode layer 112 may have a first anode end 210(1) and a second anode end 210(2), which define a second length (L2) of the anode layer 112 that is greater than the first length (L1) of the cathode layer 108. The length (L2) of the anode layer 112 may exceed that of the cathode layer 108 such that the first anode end 210(1) may be closer to a first battery end 212(1) of the battery 106 than the first cathode end 208(1). Also, the second anode end 210(2) may be closer to a second battery end 212(2) of the battery 106 than the second cathode end 208(2). In some implementations, the separator 114 may have a third length (L3) greater than the length (L2) of the anode layer 112 and the length (L1) of the cathode layer 108. For example, a first separator end 214(1) may be closer to the first battery end 212(1) than the first cathode end 208(1) or first anode end 210(1). Continuing the example, second separator end 214(2) may be closer to the second battery end 212(2) than the second cathode end 208(2) or the second anode end 210(2).

In some cases, when one or more flexure stresses 104 are applied to the battery 106, one or more layers of the battery 106 may slide or otherwise move in a lateral direction 204 relative to one or more other layers. In such cases, the greater length (L2) of the anode layer 112 or the greater length (L3) of the separator 114 compared to the length (L1) of the cathode layer 108 may prevent the cathode layer 108 from overlapping an adjacent cathode layer 108. For example, FIG. 2 depicts a flexed view 202 of the battery 106 in which the battery 106 is affected by one or more flexure stresses 104. As a result of the bending or flexing of the battery 104, the cathode layer 108 may move a distance (D) in a lateral direction 204 relative to one or more of the anode layer 112, the separator 114, or the enclosure 206. However, due to the length (L2) of the anode layer 112 and the length (L3) of the separator 114 exceeding the length (L1) of the cathode layer 108, the second anode end 210(2) and the second separator end 214(2) are closer to the second battery end 212(2) than the second cathode end 208(2).

Figure 3:
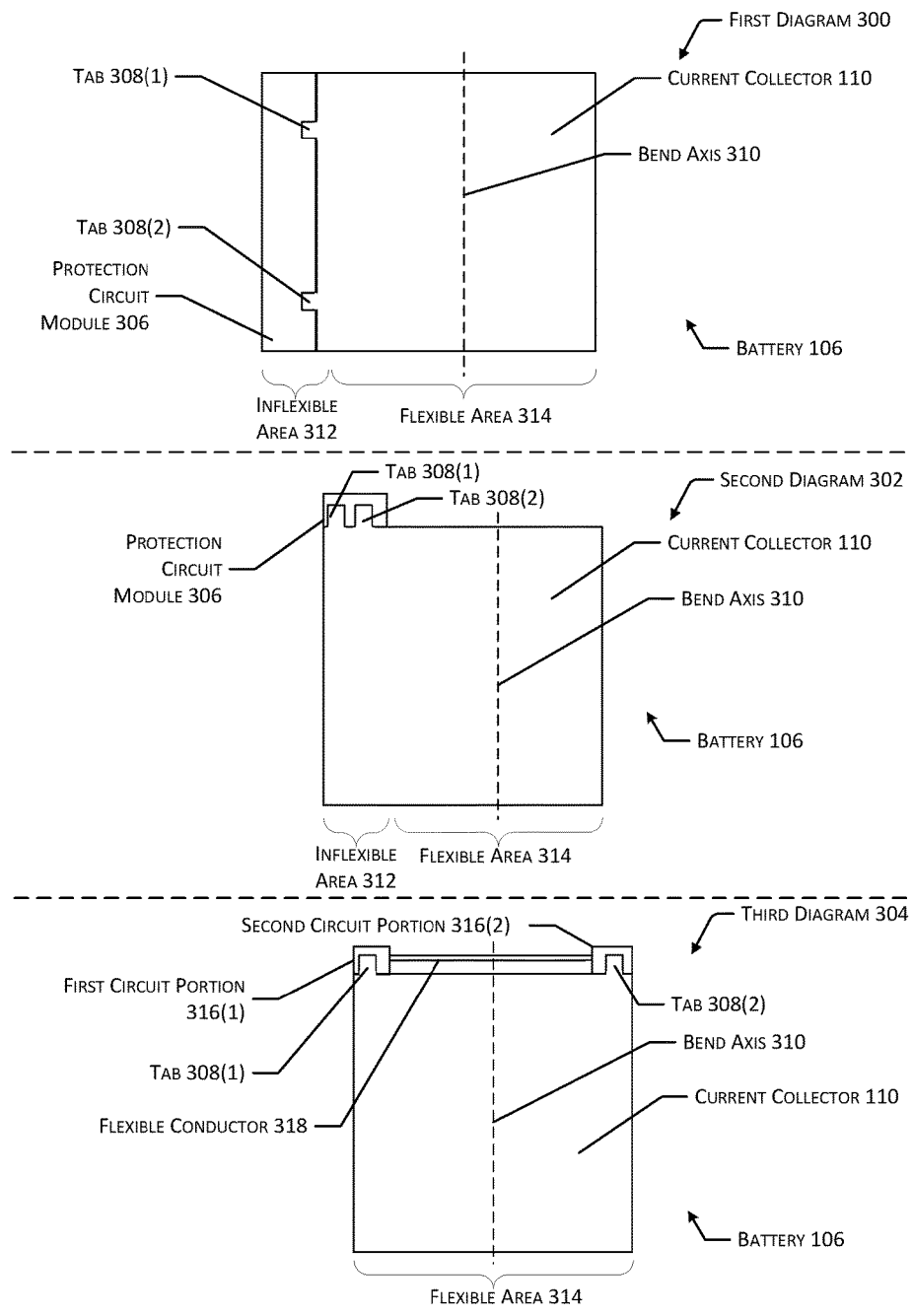
FIG. 3 depicts diagrams illustrating various engagements between a power source and other circuitry.

FIG. 3 depicts multiple diagrams illustrating various implementations of engagements between a power source and other circuitry. Specifically, FIG. 3 depicts a first diagram 300, a second diagram 302, and a third diagram 304, each illustrating an engagement between a current collector 110 of a battery 106 and an associated protection circuit module 306. As described previously, to reduce the overall thickness of the battery 106, the current collector 110 may be provided with a generally flat, planar shape, and rather than welding additional material to the current collector 110 to engage the protection circuit module 306, the current collector 110 may be formed with integral tabs 308 or other types of protrusions extending therefrom. For example, a current collector 110 may be formed as a single piece of material that is stamped, cut, machined, molded, or otherwise shaped to include integral tabs 308 for engagement with the protection circuit module 306. Continuing the example, the tabs 308 may extend outward from an edge of the current collector 110 and parallel to the generally planar shape thereof, such that the tabs 308 do not add any additional thickness to the battery 106 beyond the thickness of the current collector 110 itself. In some implementations, an additional plate of nickel or another material may be attached to one or more of the tabs 308 to facilitate engagement with the protection circuit module 306.

In the first diagram 300, FIG. 3 depicts the protection circuit module 306 engaged with an edge of the current collector 110 that is parallel to the bend axis 310 about which the battery 106 may be flexed or bent. While the protection circuit module 306 is depicted having a length equal to that of the current collector 110, in other implementations, the protection circuit module 306 may be shorter than the current collector 110. FIG. 3 depicts the current collector 110 having a first tab 308(1) and a second tab 308(2), each tab 308 positioned proximate to opposing edges of the current collector 110. In other implementations, one or both tabs 308 may be proximate to the center of the current collector 110, extending from the edge that engages the protection circuit module 306. In another implementation, both tabs 308 may be proximate to a single edge of the current collector 110. Because the tabs 308 extend outward from the current collector 110 in a direction perpendicular to the bend axis 110, the tabs 308 may be provided with a reduced length to reduce the likelihood of stress or damage to the tabs 308 or other portions of the current collector 110 or protection circuit module 306.

In some implementations, the protection circuit module 306 may be generally inflexible, or less flexible than the current collector 110 and other layers of the battery 106. As such, the placement of the protection circuit module 306 along an edge of the current collector 110 may define an inflexible area 312 of the battery 106. The remainder of the battery 106 that does not include the protection circuit module 306 may be a flexible area 314 that is able to be bent about the bend axis 310. In other implementations, one or more portions of the protection circuit module 306 itself may be flexible, such that areas of the battery 106 that include the protection circuit module 306 may also be flexible areas 314.

In the second diagram 302, FIG. 3 depicts the protection circuit module 306 engaged to an edge of the current collector 110 that is perpendicular to the bend axis 310 about which the battery 106 may be flexed. For example, a first tab 308(1) and a second tab 308(2) are shown proximate to one another, and proximate to an edge of the current collector 310, to accommodate placement of the protection circuit module 306. Because the protection circuit module 306 may be generally inflexible, or less flexible than the current collector 110 and other layers of the battery 106, placement of the protection circuit module 306 in a position that overlaps one side of the current collector 110 may cause that portion of the current collector 110 and other layers of the battery 106 to be an inflexible area 312. The remainder of the battery 106 that does not overlap the protection circuit module 306 may be a flexible area 314. Because the tabs 308 extend from the current collector 310 in a direction that is parallel to the bend axis 310, the tabs 308 may be provided with a greater length than those shown in the first diagram 300, due to the fact that flexing of the battery 106 about the bend axis 310 will not generate stress along the length of the tabs 308. In other implementations, one or more portions of the protection circuit module 306 itself may be flexible, such that areas of the battery 106 that include the protection circuit module 306 may also be flexible areas 314.

In the third diagram 304, FIG. 3 depicts the protection circuit module 306 including two portions: a first circuit portion 316(1) positioned near a first edge of the current collector 110 and a second circuit portion 316(2) positioned near a second edge of the current collector 110 opposite the first edge. The first circuit portion 316(1) and second circuit portion 316(2) may be connected by a flexible conductor 318, such as a wire, cable, or other type of conduit. To engage the circuit portions 316, a first tab 308(1) may extend from the current collector 110 near the first edge thereof to engage the first circuit portion 316(1), and a second tab 308(2) may extend from a position near the second edge to engage the second circuit portion 316(2). Separation of the protection circuit module 306 into multiple circuit portions 316 connected by a flexible conductor 318 may minimize the effect of the placement of the protection circuit module 306 on the flexibility of the battery 106. As a result, all or substantially all, of the area of the battery 106 may be a flexible area 314.

Figure 4:
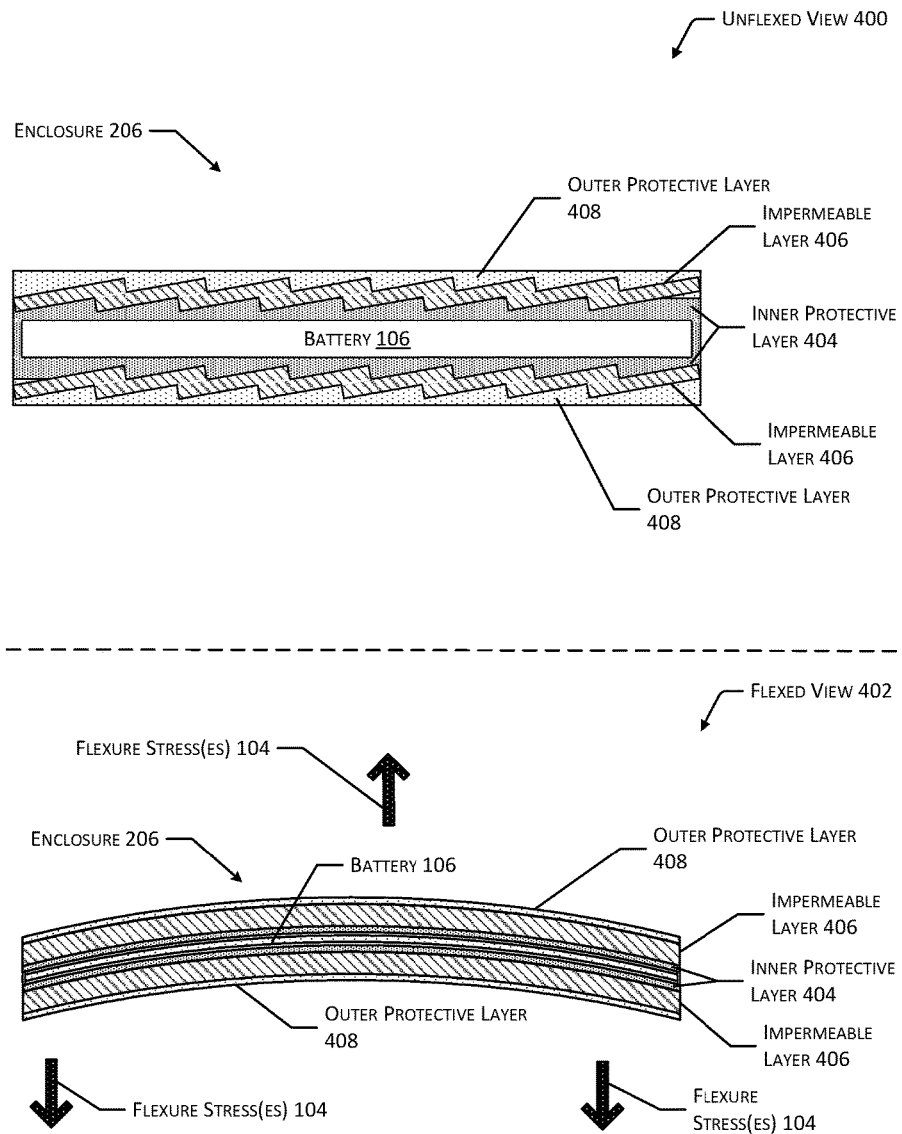
FIG. 4 depicts views illustrating a partial cross-sectional view of an enclosure for a power source at a first time in the absence of a flexure stress and at a second time under application of one or more flexure stresses illustrating flexing of the enclosure.

FIG. 4 depicts two views illustrating a partial cross-sectional view of an enclosure 206 for a power source. The views include an unflexed view 400 in the absence of a flexure stress 104, and a flexed view 402 illustrating the enclosure 206 during application of one or more flexure stresses 104, to illustrate flexing of the enclosure 206. Specifically, FIG. 4 depicts the power source as a battery 106, such as a lithium-ion battery 106, however, in other implementations, other types of power sources may be used. The enclosure 206 may encircle each side of the battery 106 to enclose the battery 106 and protect the layers of the battery 106 and the electrolyte from exposure to the ambient environment. The enclosure 206 may also protect components of a device containing the battery 106 from exposure to the electrolyte or other materials of the battery 106. The enclosure 206 may include an inner protective layer 404 proximate to the battery 106, which may be formed from polypropylene trilaminate or another type of polymer or adhesive. In addition to protecting components of the battery 106, the inner protective layer 404 may function as an adhesive layer. For example, the inner protective layer 404 may be used to secure the enclosure 206 to one or more portions of the battery 106 and to adhere both sides of the enclosure 206 to one another about the edges of the battery 106, forming one or more sealed edges (not shown in FIG. 4). In other implementations, an inner protective layer 404 having adhesive properties may be omitted, and the enclosure 206 may be sealed using other means of attachment, such as a mechanical engagement.

The enclosure 206 may also include an impermeable layer 406 positioned external to the inner protective layer 404. The impermeable layer 406 may function as a water-impermeable barrier that prevents passage of electrolyte or other liquid from the battery 106 to the exterior of the enclosure 206, and prevents passage of water or other liquids from the exterior of the enclosure 206 to the interior where the battery 106 is contained. In some implementations, the impermeable layer 406 may include a layer of aluminum. In other implementations, the impermeable layer 406 may include one or more other metals, metalloids, polymers, or composites that are at least partially impermeable to water or other liquids. As described previously, aluminum and similar impermeable materials may crack, deform, or become otherwise damaged when subjected to repeated flexure stresses 104. To reduce the likelihood of damage to the impermeable layer 406 upon bending or flexing thereof, the impermeable layer 406 may be provided with a corrugated configuration. For example, the impermeable layer 406 may be pleated, folded, or otherwise provided with bends or folds that may be extended as the impermeable layer 406 is bent or flexed. Extension of preexisting pleats or folds within the impermeable layer 406 may avoid damage to the impermeable layer 406 that may be caused by bending or flexing of the impermeable layer 406 by one or more flexure stresses 104. When flexure stresses 104 are no longer applied to the enclosure 206 or if one or more flexure stresses 104 are applied in an opposite direction, the extended pleats or folds within the impermeable layer 406 may retract, and the impermeable layer 406 may return from an extended configuration to a corrugated configuration.

In some implementations, the enclosure 206 may also include an outer protective layer 408 positioned external to the impermeable layer 406. For example, the outer protective layer 408 may include a layer of nylon or a similar material that protects the impermeable layer 406 from scratches or other types of damage that may be caused by exposure to objects outside of the enclosure 206. In some cases, the outer protective layer 408 may be configured to receive text, images, dyes, and so forth, to enable the enclosure 206 to be provided with a selected color, information regarding the battery 106, an aesthetic or informational image or graphic, and so forth. For example, a layer of nylon may be dyed a selected color and have text and graphics printed thereon.

In some implementations, the inner protective layer 404 and outer protective layer 408 may be sufficiently elastic or flexible, such that bending and flexing of the enclosure 206 will not cause significant damage or deformation of the inner protective layer 404 and outer protective layer 408. For example, thin layers of nylon and propylene may have a generally high elasticity and tensile strength sufficient to withstand bending of the enclosure 206.

In some implementations, the overall thickness of the battery 106 and enclosure 206 may be less than 1 millimeter. For example, in one implementation, the thickness of one side of the enclosure 206 may be 155 microns. Continuing the example, the inner protective layer 404 may include a layer of polypropylene that is 25 microns in thickness and the outer protective layer 408 may include a layer of nylon that is 25 microns in thickness. The impermeable layer 406 may include a layer of aluminum that is 35 microns in thickness, that, when positioned in the corrugated configuration, includes portions that overlap one another twice, having a thickness of 105 microns. For example, a corrugated portion of the aluminum layer may be folded such that three layers of the aluminum layer overlap one another, each individual layer having a thickness of 35 microns.

Figure 5:
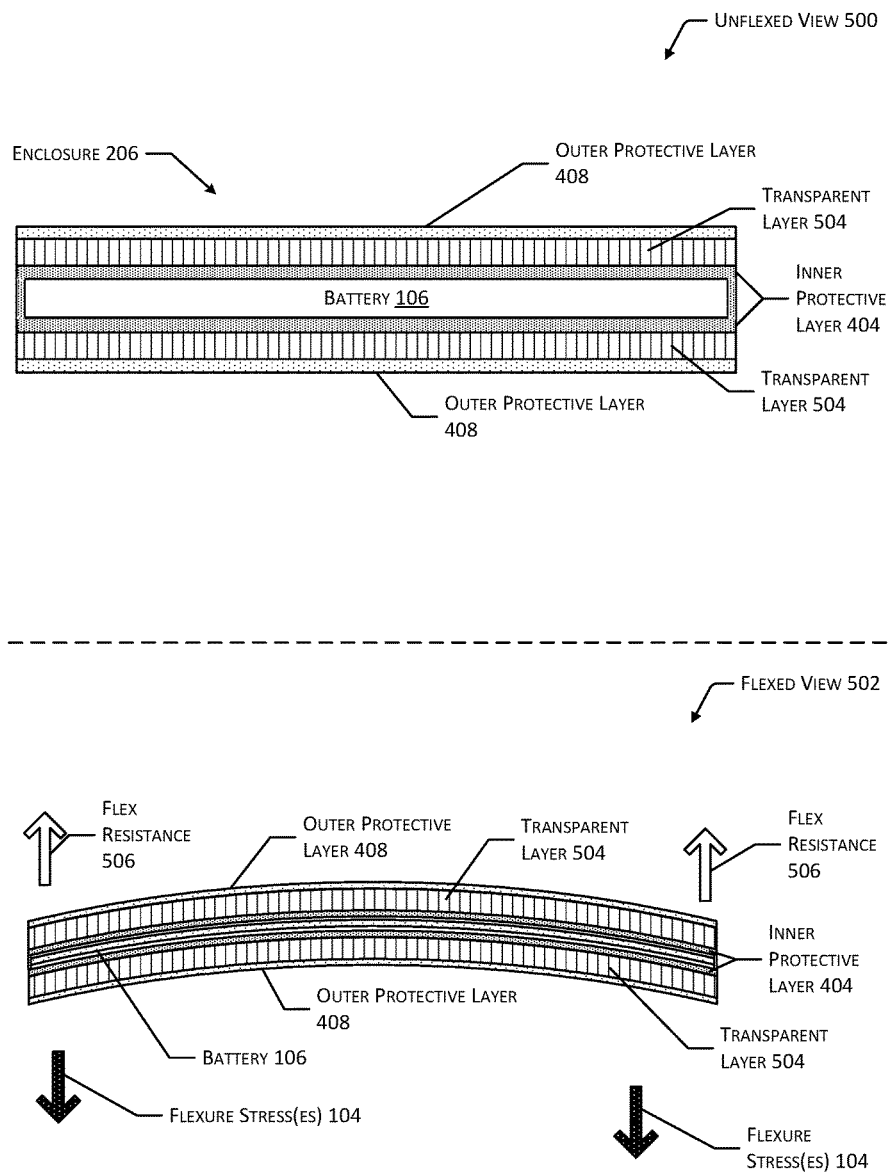
FIG. 5 depicts views illustrating a partial cross-sectional view of an enclosure for a power source at a first time in the absence of a flexure stress and at a second time under application of one or more flexure stresses, the power source including a transparent layer for visualizing the power source.

FIG. 5 depicts two views illustrating a partial cross-sectional view of an enclosure 206 for a power source. The views include an unflexed view 500 illustrating the absence of a flexure stress 104 and a flexed view 502 illustrating the enclosure 206 under application of one or more flexure stresses 104, the enclosure 206 including a transparent layer 504 for visualizing the power source. For example, the power source is shown including a battery 106, such as a lithium-ion battery 106, that is contained within an enclosure 206, such as a pouch-type enclosure 206 that may encircle each side of the battery 106. As described previously with regard to FIG. 4, an enclosure 206 that may be used to contain a battery 106 may include an inner protective layer 404 proximate to the battery 106, which may be formed from polypropylene trilaminate or another type of polymer or adhesive. The inner protective layer 404 may have adhesive properties and may be used to secure the enclosure 206 about the battery 106 by adhering both sides of the enclosure 206 to one another about the edges of the battery 106, forming one or more sealed edges (not shown in FIG. 5).

The enclosure 206 may include a transparent layer 504 external to the inner protective layer 404. The transparent layer 504 may be impermeable to water or other liquids, similar to the impermeable layer 406 shown in FIG. 4. Additionally, the transparent layer 504 may be formed from a transparent material, such as a thin layer of glass. For example, a Willow glass laminate having a thickness of 0.1 mm may be flexed to a bend radius of approximately 50 mm without damage, while a Willow glass laminate having a thickness of 0.2 mm may be flexed to a bend radius of approximate 100 mm without damage. In some implementations, an outer protective layer 408 may be positioned external to the transparent layer 504. The outer protective layer 408 may include, for example, a thin layer of nylon or a similar material.

The transparent layer 504 may enable components of the battery 106 to be visible through the enclosure 206, which may enable visual inspection of the battery 106 for damage, deformation, corrosion, and the like. Use of a transparent layer 504 may also be used to provide the battery 106 with a desired aesthetic appearance that may be viewed through the transparent layer 504. In some implementations, the battery 106 may include one or more lights, color-changing materials, materials that change in one or more other visible properties, one or more meters or displays, or other types of visible indicia that may be viewed through the transparent layer 504 to provide information regarding the status or health of the battery 106.

In some implementations, the thickness of one side of the enclosure 206 may be 150 microns or less. For example, the transparent layer 504 may include a layer of glass having a thickness of 100 microns or less, the outer protective layer 408 may include a layer of nylon having a thickness of 25 microns, and the inner protective layer 404 may include a layer of polypropylene having a thickness of 25 microns.

In some implementations, the transparent layer 504, or another type of impermeable layer 406, may be used to prevent excessive flexing or bending of the battery 106, enclosure 206, or an attached portion of a device (not shown in FIG. 5). For example, a battery 106 may be formed from materials that may flex to a bend radius of 50 mm, however, flexing beyond this bend radius may damage one or more components of the battery 106 or an associated device. The transparent layer 504 or impermeable layer 406 of the enclosure 206 may be used as a stiffening layer that prevents bending or flexing of a battery 106 or device beyond a particular radius of curvature.

For example, at the flexed view 502, FIG. 5 depicts one or more flexure stresses 104 applied to the battery 106 and enclosure 206, which may cause bending thereof. The transparent layer 504 may include a layer of Willow glass having a thickness of 100 microns, which may be bent to a bend radius of 50 mm without damage. As the enclosure 206 is bent under the force of the flexure stress(es) 104, the transparent layer 504 may apply a flex resistance 506, which may include one or more forces in a direction opposite that of the flexure stress(es) 104. The flex resistance 506 of the transparent layer 504 may resist bending or flexing of the battery 106 and enclosure 206 beyond a fixed radius of curvature, such as 50 mm.

Figure 6:
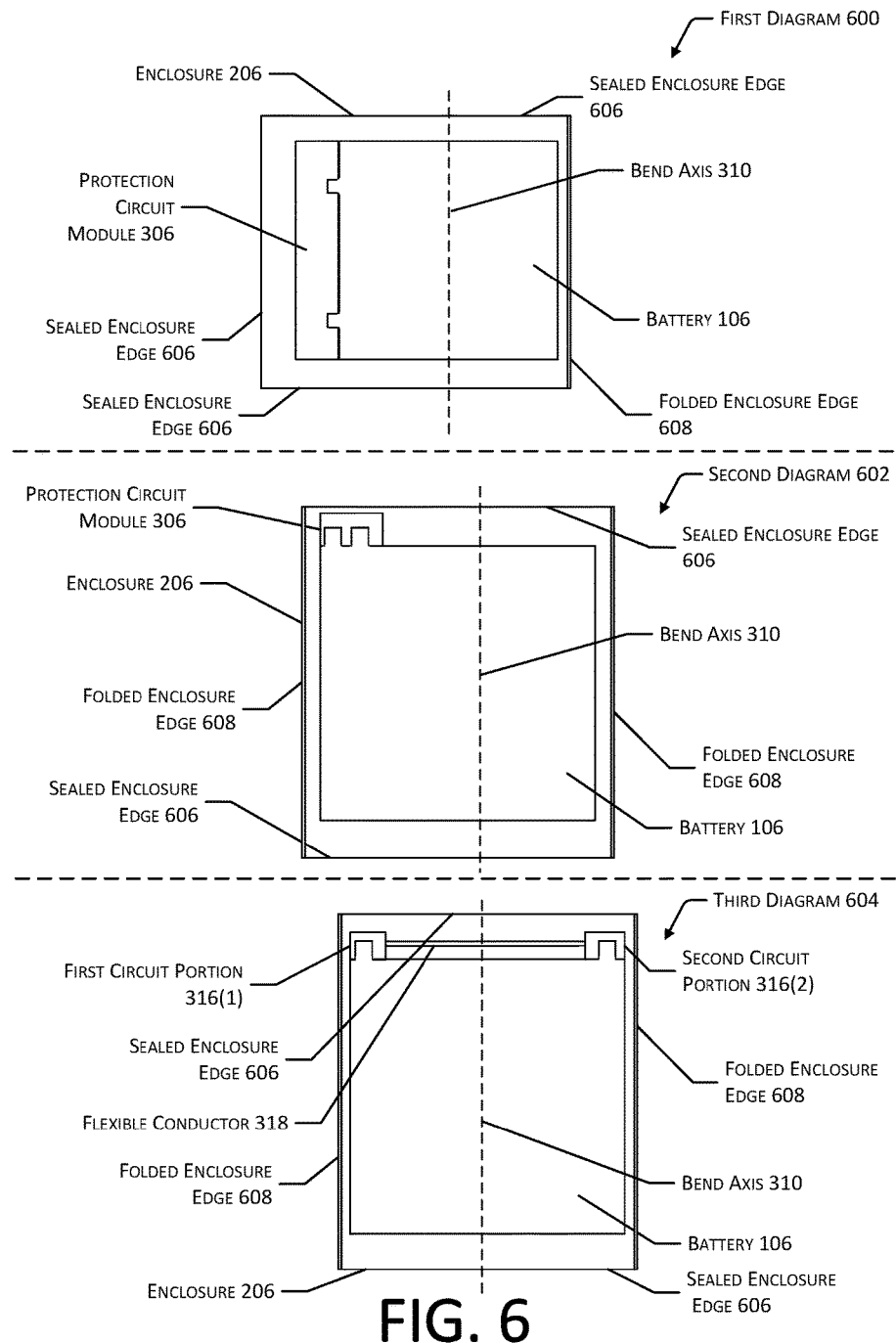
FIG. 6 depicts diagrams illustrating various engagements between a power source and an enclosure.

FIG. 6 depicts multiple diagrams illustrating various implementations of engagements between a power source and an enclosure 206. Specifically, FIG. 6 depicts a first diagram 600, a second diagram 602, and a third diagram 604, each illustrating an engagement between a battery 106 and an associated enclosure 206. As described with regard to FIGS. 4 and 5, the enclosure 206 may include a pouch-type enclosure 206 having an inner protective layer 404 that may also be used to adhesively seal a first side of the enclosure 206 to a second side of the enclosure 206 to contain the battery 106. In some cases, an edge of the enclosure 206 may be folded prior to sealing the edge to reduce the length or width (e.g., the X-Y footprint) of the battery 106 and enclosure 206. For example, if an edge of the enclosure 206 is folded prior to sealing, the width of the edge may be less than if the edge were to be sealed without first folding the edge. However, as described previously, if the enclosure 206 is flexed or bent in a non-parallel direction relative to a folded edge of the enclosure 206, the presence of folds in the edge may increase the likelihood of stress or damage to the folded edge when subjected to a flexure stress 104. Therefore, in some implementations, edges that are non-parallel to the bend axis 310 of a battery 106 and enclosure 206 may be sealed without folding. Additionally, in some cases, placement of a protection circuit module 306 may affect the manner in which an edge of the enclosure 206 is sealed. For example, an edge adjacent to a protection circuit module 306 may be sealed without folds for increased robustness, while an edge opposite the protection circuit module 306 may be folded prior to sealing. In some cases, the width of a sealed edge may be increased to increase the mechanical strength of the seal. For example, an edge may be provided with a width of greater than 3 mm, such as 5 mm, to increase the mechanical strength thereof. In some implementations, a folded edge may enclose the battery 106 without adhesively sealing the edge using the inner protective layer 404.

In the first diagram 600, FIG. 6 depicts a battery 106 having a protection circuit module 306 engaged along an edge thereof. The protection circuit module 306 may be engaged with an edge of the battery 106 that is parallel to the bend axis 310 thereof. The enclosure 206 therefore includes two edges that are parallel to the bend axis 310 and two edges that are perpendicular to the bend axis 310. One of the edges that is parallel to the bend axis 310 is adjacent to the protection circuit module 306, while the other of the edges that is parallel to the bend axis 310 is opposite the protection circuit module 306.

To reduce the likelihood of stress or damage to the enclosure 206, the edges that are perpendicular to the bend axis 310 may be sealed enclosure edges 606, that are not folded prior to sealing. Additionally, the edge adjacent to the protection circuit module 306 may include a sealed enclosure edge 606. The edge that is opposite the protection circuit module 306 and parallel to the bend axis 310 may include a folded enclosure edge 608 that is folded prior to sealing, to reduce the overall width of the enclosure 206. In other implementations, the folded enclosure edge 608 may instead be sealed without folding to increase the width of the seal and the mechanical strength thereof.

In the second diagram 602, FIG. 6 depicts a protection circuit module 306 engaged with an edge of a battery 106 that is perpendicular to the bend axis 310. Therefore, the depicted enclosure 206 includes two edges that are parallel to the bend axis 310, one edge that is perpendicular to the bend axis 310 and adjacent to the protection circuit module 306, and one edge that is perpendicular to the bend axis 310 and opposite the protection circuit module 306. To reduce the likelihood of stress or damage to the enclosure 206, the edges that are perpendicular to the bend axis 310 may include sealed enclosure edges 606, that are not folded prior to sealing. The edges that are parallel the bend axis 310 may include folded enclosure edges 608 that are folded prior to sealing, to reduce the overall width of the enclosure 206. In other implementations, one or both of the folded enclosure edges 608 may instead be sealed without folding to increase the width of one or both seals and the mechanical strength thereof.

In the third diagram 604, FIG. 6 depicts a first circuit portion 316(1) and a second circuit portion 316(2) of the protection circuit module 306 engaged to different portions of a single edge of the battery 106, connected by a flexible conductor 318. The edge to which the circuit portions 316 are engaged is perpendicular to the bend axis 310 of the battery 106 and enclosure 206. Therefore, the depicted enclosure 206 includes two edges that are parallel to the bend axis 310, one edge that is perpendicular to the bend axis 310 and adjacent to the circuit portions 316, and one edge that is perpendicular to the bend axis 310 and opposite the circuit portions 316. To reduce the likelihood of stress or damage to the enclosure 206, the edges that are perpendicular to the bend axis 310 may include sealed enclosure edges 606, that are not folded prior to sealing. The edges that are parallel the bend axis 310 may include folded enclosure edges 608 that are folded prior to sealing, to reduce the overall width of the enclosure 206. In other implementations, one or both of the folded enclosure edges 608 may instead be sealed without folding to increase the width of one or both seals and the mechanical strength thereof.

Figure 7:
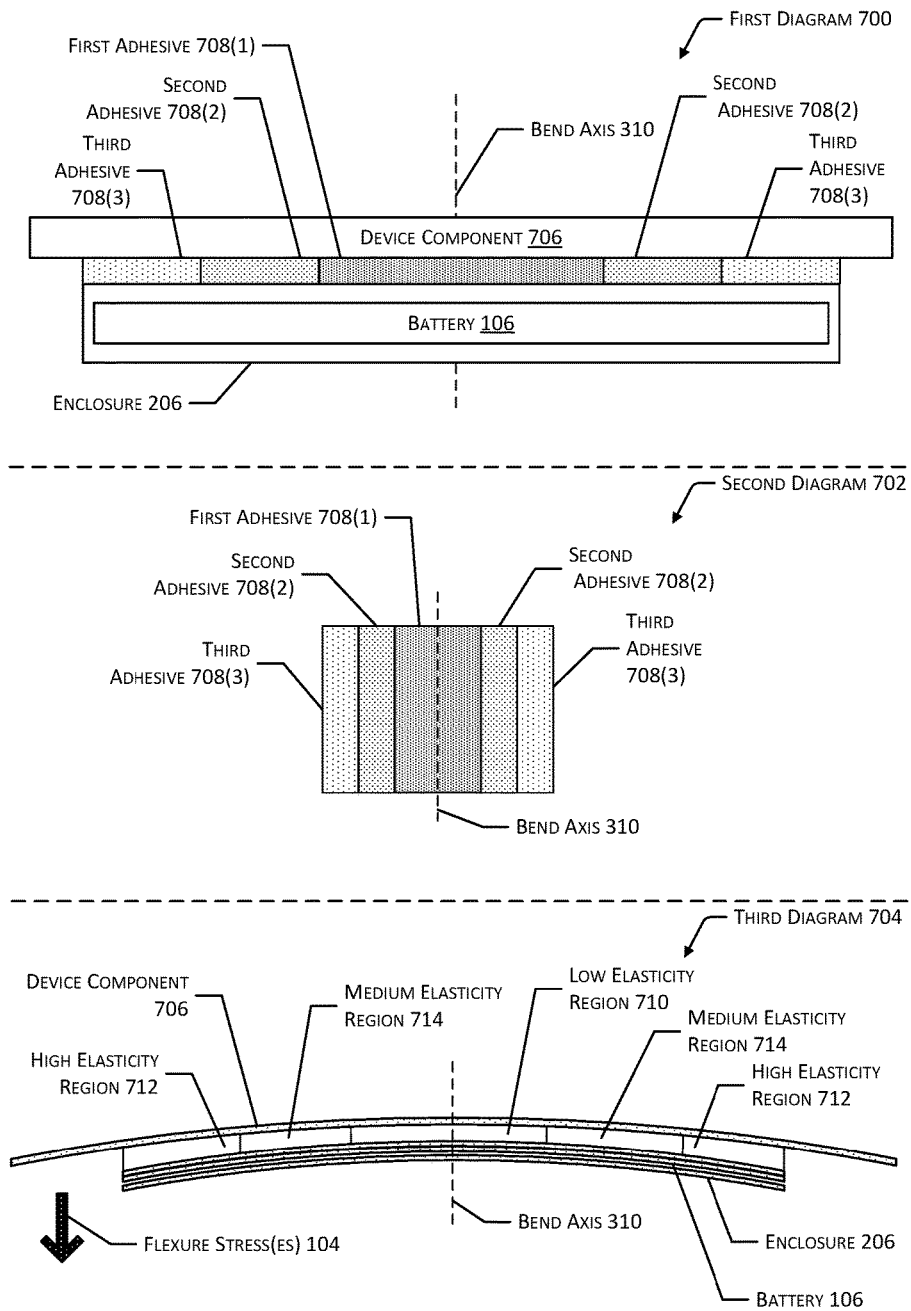
FIG. 7 depicts diagrams illustrating an engagement between a power source and a component of a device.

FIG. 7 depicts diagrams illustrating an engagement between a power source and a component of a device. Specifically, FIG. 7 illustrates a first diagram 700, a second diagram 702, and a third diagram 704, each of the diagrams showing different views of an engagement between the enclosure 206 of a battery 106 and a device component 706 using one or more adhesives 708. For example, a battery 106, such as that described with regard to FIGS. 1-6 may be used to provide power to various types of devices that may be bent or flexed during use, such as wearable computing devices, e-book readers, other types of portable computers, and so forth. Thus, the device component 706 may include one or more of a circuit board, a housing, a display, an input device such as a keyboard or touch sensor, a speaker, and so forth. FIG. 7 also illustrates a bend axis 310 about which the device component 706, the battery 106, and the enclosure 206 may be flexed.

As shown in the first diagram 700 and the second diagram 702, one or more adhesives 708 may be used to secure the device component 706 to the enclosure 206, each adhesive 708 being placed in a particular region between the device component 706 and enclosure 206. Specifically, the first diagram 700 includes a diagrammatic side view showing placement of the adhesive(s) 708, while the second diagram 702 shows a diagrammatic top view. During flexing of the device component 706, battery 106, and enclosure 206 via one or more flexure stresses 104, the adhesive(s) 708 between the device component 706 and enclosure 206 may be subjected to elongation and lateral stresses. Therefore, the adhesives 708 provided to different regions between the device component 706 and enclosure 206 may have different properties, such as elasticity, to allow for different amounts of elongation of the adhesive 708 and different amounts of lateral or orthogonal movement between the device component 706 and enclosure 206.

For example, a first adhesive 708(1) having a generally low elasticity may be provided near the center of the engagement between the enclosure 206 and the device component 706, at and near the bend axis 310. The low elasticity of the first adhesive 708(1) may facilitate formation of a strong bond between the device component 706 and enclosure 206 to prevent detachment of the battery 106 from the associated device. A second adhesive 708(2) may be provided in regions adjacent to the first adhesive 708(1). The second adhesive 708(2) may have an elasticity greater than that of the first adhesive 708(1) to allow for a greater degree of sliding or other movement between the device component 706 and the enclosure 206. A third adhesive 708(3) may be provided in regions proximate to the edges of the enclosure 206 and may have an elasticity greater than that of the second adhesive 708(2) to allow for a greater degree of sliding or movement between the device component 706 and the enclosure 206, due to the increased stresses applied to the ends of the engagement via the flexure stress(es) 104.

While FIG. 7 depicts three discrete adhesives 708, in some implementations, two or more of the first adhesive 708(1), second adhesive 708(2), or third adhesive 708(3) may include the same adhesive compound having different characteristics. For example, regions containing the first adhesive 708(1) may include greater concentrations of an adhesive compound than regions containing the third adhesive 708(3). As another example, regions containing the first adhesive 708(1) may include a mixture of adhesive components having a first ratio, while regions containing the third adhesive 708(3) may include a mixture of the same adhesive components having a different ratio.

The third diagram 704 depicts the device component 706, enclosure 206, and battery 106 under the application of one or more flexure stresses 104, which may bend the components and apply lateral or elongation stresses to the adhesives 708. Regions near the center of the engagement between the device component 706 and the enclosure 206, proximate to the bend axis 310, that contain the first adhesive 708(1) may include low elasticity regions 710 that allow for substantially no lateral or vertical movement between the device component 706 and enclosure 206. Regions proximate to the edges of the engagement between the enclosure 206 and the device component 706, that include the third adhesive 708(3), may include high elasticity regions 712 that allow for a greater amount of lateral or vertical movement between the device component 706 and enclosure 206 under the influence of one or more flexure stresses 104. Regions between the low elasticity region(s) 710 and high elasticity region(s) 712 may include medium elasticity regions 714. The medium elasticity regions 714 may allow for greater lateral or vertical movement between the device component 706 and enclosure 206 than the movement allowed at the low elasticity region(s) 710, but less than the movement allowed at the high elasticity region(s) 712.

Figure 8:
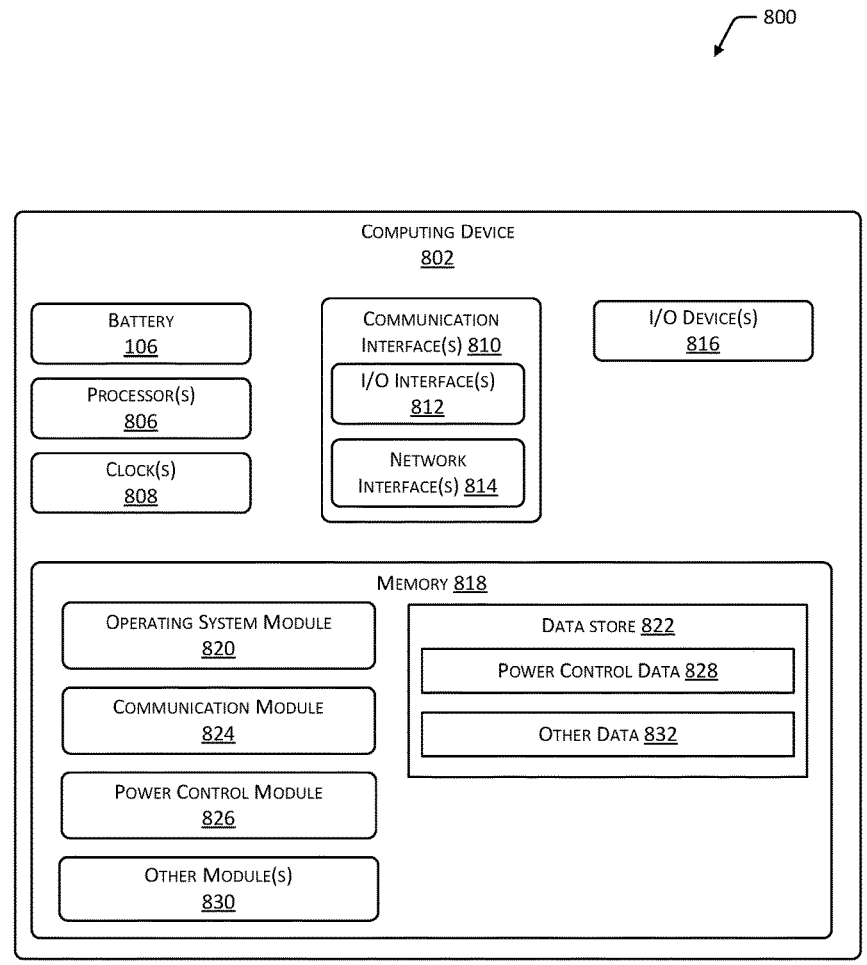
FIG. 8 is a block diagram depicting a computing device that includes a flexible power source.

FIG. 8 is a block diagram 800 illustrating a computing device 802 within the scope of the present disclosure. The computing device 802 may include any type of device that may receive power from a bendable or flexible battery 106, such as the battery 106 depicted and described with regard to FIGS. 1-7. For example, the computing device 802 may include a wearable computing device 802, an e-book reader, a smartphone, or any other type of device, at least a portion of which may be designed to be bent or flexed during use. The flexibility of the battery 106 may facilitate the ability of the computing device 802 to be bent or flexed, uninhibited by the placement of the battery 106. In some implementations, the battery 106 may be flexible to a limited radius of curvature to protect one or more components of the computing device 802. For example, a battery 106 that resists flexing beyond a bend radius of 200 mm may prevent damage to components of the computing device 802 that may be damaged if bent beyond a bend radius of 200 mm. The battery 106 may include a protection circuit module 306 to regulate the transfer of power to and from the battery 106 and an enclosure 206 containing components of the battery 106 and preventing exposure of the contents of the battery 106 to other components of the computing device 802.

While FIG. 8 depicts the battery 106 as one possible power source to provide electrical power suitable for operating the components of the computing device 802, in other implementations, other types of power sources may be used, such as a fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, and so forth. Data from the clock 808 may also be used to estimate levels of power associated with the battery 106, such as a remaining level of power after an elapsed period of time.

The computing device 802 may include one or more communication interface(s) 810, such as input/output (I/O) interface(s) 812, network interface(s) 814, and so forth. The communication interfaces 810 may enable the computing device 802, or components of the computing device 802, to communicate with other computing devices 802 or components thereof. The I/O interface(s) 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O device(s) 816. The I/O devices 816 may include any manner of input device or output device associated with the computing device 802 or with another computing device 802 in communication therewith. For example, I/O devices 816 may include touch sensors, keyboards, mouse devices, microphones, image sensors (e.g., cameras), scanners, displays, speakers, haptic devices, printers, motion sensors, location sensors, and so forth. In some implementations, the I/O device(s) 816 may be physically incorporated with a computing device 802 or may be externally placed.

The network interface(s) 814 may be configured to provide communications between the computing device 802 and other devices, such as the I/O devices 816, routers, access points, and so forth. The network interface(s) 814 may include devices configured to couple to one or more networks, including local area networks (LANs), wireless LANs, wide area networks (WANs), wireless WANs, and so forth. For example, the network interfaces 814 may include computing devices 602 compatible with Ethernet, Wi-Fi, Wi-Fi Direct, Bluetooth, Bluetooth Low Energy, ZigBee, Z-Wave, 3G, 4G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD operating system as promulgated by the FreeBSD Project; UNIX or a UNIX-like operating system; a variation of the Linux operating system as promulgated by Linus Torvalds; the Windows operating system from the Microsoft Corporation of Redmond, Wash., USA; or other operating systems.

A data store 822 and one or more modules may also be stored in the memory 818. The modules may be executed as foreground applications, background tasks, daemons, and so forth. The data store 822 may use a flat file, database, linked list, tree, executable code, script, or other data structure to store information. In some implementations, the data store 822 or a portion of the data store 822 may be distributed across one or more other devices including other computing devices 802, network attached storage devices, and so forth.

A communication module 824 stored in the memory 818 may be configured to establish communications with other computing devices 802.

The memory 818 may also store the power control module 826, which may be configured to monitor quantities of power transferred to or from the battery 106, a state of health of the battery 106, and so forth. The power control module 826 may also be used to control the charging and discharging of the battery 106. In some implementations, the power control module 826 may be configured to receive user input associated with the transfer of power to or from the battery 106 or generate output indicative of one or more characteristics of the battery 106. Power control data 828 in the data store 822 may include various user settings, default values, threshold values, rules, algorithms, and so forth, that may be used to determine the state of the battery 106 and to perform functions using the battery 106 based on determined characteristics of the battery 106 or computing device 802.

Other modules 830 may also be present in the memory 818. For example, the computing device 802 may include any number of modules associated with the purpose or function of the computing device 802. Continuing the example, an e-book reader may include modules for retrieving and transmitting electronic content, outputting text and images, receiving user input via a touch interface, adjusting levels of illumination, and so forth. A smartphone or wearable computing device 802 may include modules for sending and receiving voice or alphanumeric data via data networks, a browser module, an e-mail module, and so forth.

Other data 832 within the data store 822 may include data used by the other modules 830 to perform functions associated with the purpose of the computing device 802.

Those having ordinary skill in the art will readily recognize that certain structures, steps, or operations illustrated in the figures or described in this disclosure may be eliminated, combined, or performed in an alternate order. Any steps or operations may be performed serially or in parallel. Furthermore, the order in which the operations are described is not intended to be construed as a limitation.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:
1. A flexible battery system comprising:
   a battery having a first end and a second end, the battery including:
   a first layer including a cathode material associated with a first current collector, the cathode material having a third end, a fourth end, and a first length;

a second layer including an anode material associated with a second current collector, the anode material having a fifth end, a sixth end, and a second length that is greater than the first length;
a protection circuit module connected to the first current collector and the second current collector; and
an enclosure containing the battery, the enclosure including:
an inner protective layer proximate to one or more of the first layer or the second layer; and
a water-impermeable layer external to the inner protective layer such that the inner protective layer is between the water-impermeable layer and the battery, wherein, under application of a flexure stress, the water-impermeable layer changes from a corrugated configuration to an extended configuration having a smooth surface;
wherein under the application of the flexure stress:
the flexible battery system is bendable to a radius of curvature of 100 millimeters or less without damage;
the first layer moves relative to the second layer;
the fifth end of the anode material is closer to the first end of the battery than the third end of the cathode material; and
the sixth end of the anode material is closer to the second end of the battery than the fourth end of the cathode material.

2. The flexible battery system of claim 1, wherein the protection circuit module includes:
a first circuit portion in electrical communication with the first current collector proximate to the first end of the battery;
a second circuit portion spaced apart from the first circuit portion and in electrical communication with the second current collector proximate to the second end of the battery; and
a flexible conductive member connected to the first circuit portion and the second circuit portion, wherein the flexible conductive member is bendable under the application of the flexure stress.

3. The flexible battery system of claim 1, wherein the flexible battery system flexes about a bend axis and the enclosure further includes:
at least one first edge perpendicular to the bend axis that includes a seal between adjacent portions of the inner protective layer, the at least one first edge lacking folds in one or more of the inner protective layer or the water-impermeable layer, wherein the at least one first edge prevents deformation of the one or more of the inner protective layer or the water-impermeable layer under application of the flexure stress.

4. The flexible battery system of claim 1, wherein one or more of the first current collector or the second current collector includes a planar shape having a protruding tab integral with and extending from an edge of the planar shape in a direction parallel to and in a same plane of the planar shape, and wherein the protection circuit module is engaged with the protruding tab.

5. A device comprising a power source, the power source having a first end and a second end, the power source including:
a first layer including a cathode material having a third end, a fourth end, and a first length; and
a second layer including an anode material having a fifth end, a sixth end, and a second length greater than the first length;
wherein at least a portion of the device is bendable under application of a flexure stress, and wherein under the application of the flexure stress:
one of the first layer or the second layer moves in a lateral direction relative to the other of the first layer or the second layer;
the fifth end of the anode material is closer to the first end of the power source than the third end of the cathode material; and
the sixth end of the anode material is closer to the second end of the power source than the fourth end of the cathode material.

6. The device of claim 5, further comprising:
a separator positioned between the first layer and the second layer, the separator having a seventh end, an eighth end, and a third length greater than the second length;
wherein under the application of the flexure stress, the seventh end of the separator is closer to the first end of the power source than the fifth end of the anode material, and the eighth end of the separator is closer to the second end of the power source than the sixth end of the anode material.

7. The device of claim 5, further comprising:
a device component adhesively secured to the power source using one or more adhesives, wherein the one or more adhesives have a first elasticity proximate to a center of the power source and a second elasticity greater than the first elasticity proximate to one or more of the first end of the power source or the second end of the power source.

8. The device of claim 5, further comprising:
a protection circuit module including:
a first circuit portion associated with the anode material;
a second circuit portion spaced apart from the first circuit portion and associated with the cathode material; and
a flexible conductive member connecting the first circuit portion to the second circuit portion, wherein the flexible conductive member is bendable under the application of the flexure stress.

9. The device of claim 5, further comprising:
a current collector integral with and extending from an edge of one or more of the anode material or the cathode material in a same plane as the one or more of the anode material or the cathode material; and
a protection circuit module engaged with the current collector.

10. The device of claim 5, the power source further comprising an enclosure containing the first layer and the second layer, the enclosure including:
an inner protective layer proximate to one or more of the first layer and the second layer; and
a water-impermeable layer external to the inner protective layer, wherein the water-impermeable layer changes from a corrugated configuration in an absence of the flexure stress to an extended configuration having a smooth surface under the application of the flexure stress.

11. The device of claim 5, the power source further comprising an enclosure containing the first layer and the second layer, the enclosure including:
an inner protective layer proximate to one or more of the first layer and the second layer; and
a transparent water-impermeable layer external to the inner protective layer, wherein one or more of the cathode material or the anode material is visible through the transparent water-impermeable layer.

12. The device of claim 5, wherein the power source has a thickness of 0.5 millimeters or less.

13. The device of claim 5, wherein the power source is bendable under the application of the flexure stress to a radius of curvature of 500 millimeters or less without damage.

14. A power source comprising:
a first layer including a cathode material;
a second layer including an anode material;
a first portion of a protection circuit module associated with the anode material;
a second portion of the protection circuit module associated with the cathode material and spaced apart from the first portion;
a flexible conductive member connecting the first portion to the second portion; and
an enclosure containing the cathode material and the anode material, the enclosure including:
an inner protective layer including an adhesive material, wherein the inner protective layer further includes a first side and a second side that enclose the first layer and the second layer;
a water-impermeable layer external to the inner protective layer; and
a plurality of edges; and
wherein the power source is bendable about a bend axis under application of a flexure stress, the flexible conductive member is bendable under the application of the flexure stress, and a first edge of the plurality of edges that is non-parallel to the bend axis includes a seal between adjacent portions of the first side and the second side of the inner protective layer, the first edge lacking folds in one or more of the inner protective layer or the water-impermeable layer.

15. The power source of claim 14, wherein the enclosure has a thickness of 160 microns or less.

16. The power source of claim 14, wherein the water-impermeable layer is formed in a corrugated configuration, and wherein the application of the flexure stress results in the water-impermeable layer changing to an extended configuration having a smooth surface.

17. The power source of claim 14, wherein the water-impermeable layer is transparent.

18. The power source of claim 17, wherein the water-impermeable layer includes a layer of glass having a thickness of 100 microns or less.

19. The power source of claim 14, wherein the first edge has a width greater than 2 millimeters for increasing mechanical robustness of a seal between the first side and the second side of the inner protective layer.

20. The power source of claim 14, wherein under application of the flexure stress:
one of the first layer or the second layer moves in a lateral direction relative to the other of the first layer or the second layer; and
a first end of the second layer is closer to a second end of the power source than a third end of the first layer.

* * * * *